(12) United States Patent
Weston et al.

(10) Patent No.: US 12,741,609 B2
(45) **Date of Patent: *Sep. 22, 2026**

(54) GESTURE-BASED VEHICLE ENTRY SYSTEM WITH VIRTUAL KEYPAD

(71) Applicant: FORD GLOBAL TECHNOLOGIES, LLC, Dearborn, MI (US)

(72) Inventors: Keith Weston, Canton, MI (US); Andrew Brown, Royal Oak, MI (US); Stuart C. Salter, White Lake, MI (US); John R. Van Wiemeersch, Novi, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/225,176

(22) Filed: Jun. 2, 2025

(65) Prior Publication Data

US 2025/0304004 A1 Oct. 2, 2025

Related U.S. Application Data

(63) Continuation of application No. 18/623,317, filed on Apr. 1, 2024, now Pat. No. 12,337,792.

(51) Int. Cl.

*B60R 25/20* (2013.01)
*B60K 35/28* (2024.01)
*G06F 3/01* (2006.01)

(52) U.S. Cl.

CPC .......... *B60R 25/2045* (2013.01); *B60K 35/28* (2024.01); *G06F 3/017* (2013.01)

(58) Field of Classification Search

CPC ..... B60R 25/2045; B60R 25/23; B60K 35/28; G06F 3/017; G06F 3/04886; G06F 3/04883; G06F 21/83

See application file for complete search history.

(56) References Cited

U.S. PATENT DOCUMENTS 7,248,151 B2 7/2007 McCall
8,994,495 B2 3/2015 Dassanayake et al.
10,421,435 B2 9/2019 Pophale et al.
11,661,032 B2 5/2023 Tang
12,017,612 B2 6/2024 Tang
12,337,792 B1 * 6/2025 Weston ............... B60R 25/2045

(Continued)

FOREIGN PATENT DOCUMENTS

EP 3032502 A1 6/2016

*Primary Examiner* — John R Schnurr

(74) *Attorney, Agent, or Firm* — Frank Lollo; Eversheds Sutherland (US) LLP

(57) ABSTRACT

Access to a vehicle is controlled by detecting gestures pointing to a virtual keypad. A setup mode preconfigures a sequence of touchpoints as a security key, wherein an administrant performs a timed series of distinct gestures according to a chosen number and location of touchpoints which are detected by the vehicle using captured real-time images. Touchpoints during a plurality of repetition trials provide respective sets of datapoints for each one of the distinct gestures in the series. A respective deviation contour is determined for each respective set and then expanded to represent regions of validity for respective touchpoints corresponding to the sequence of touchpoints. The expanded deviation contours are accepted as defining the sequence of touchpoints for the security key if there is no overlap between any expanded deviation contours to complete the setup mode.

20 Claims, 5 Drawing Sheets

(56) References Cited

U.S. PATENT DOCUMENTS

| | | | |
|---|---|---|---|
| 2006/0145825 | A1 | 7/2006 | McCall |
| 2011/0181387 | A1 | 7/2011 | Popelard |
| 2014/0015637 | A1 | 1/2014 | Dassanayake |
| 2015/0161836 | A1 | 6/2015 | Park |
| 2015/0360646 | A1 | 12/2015 | Pribisic |
| 2015/0363986 | A1 | 12/2015 | Hoyos |
| 2016/0148487 | A1 | 5/2016 | Thomas |
| 2017/0018129 | A1 | 1/2017 | Huebner |
| 2017/0057357 | A1 | 3/2017 | Borghi |
| 2017/0072908 | A1 | 3/2017 | Liubakka |
| 2017/0101076 | A1 | 4/2017 | Krishnan |
| 2017/0139506 | A1 | 5/2017 | Rodriguez |
| 2017/0349142 | A1 | 12/2017 | Krishnan |
| 2018/0215345 | A1 | 8/2018 | Elangovan |
| 2018/0244239 | A1 | 8/2018 | Van Wiemeersch |
| 2018/0367139 | A1 | 12/2018 | Pribisic |
| 2019/0005755 | A1 | 1/2019 | Snider |
| 2019/0126889 | A1 | 5/2019 | Oman |
| 2019/0143936 | A1 | 5/2019 | Abel Rayan |
| 2019/0152433 | A1 | 5/2019 | Cumbo |
| 2020/0070777 | A1 | 3/2020 | Chen |
| 2020/0219338 | A1 | 7/2020 | Chen |
| 2020/0233540 | A1 | 7/2020 | Salter |
| 2020/0234030 | A1 | 7/2020 | Baheti |
| 2020/0291676 | A1 | 9/2020 | Shah |
| 2022/0024415 | A1 | 1/2022 | Wu et al. |
| 2022/0186533 | A1 | 6/2022 | Prince |
| 2023/0120250 | A1 | 4/2023 | Tang |
| 2023/0339431 | A1 | 10/2023 | Kuehner |
| 2024/0166165 | A1 | 5/2024 | Van Wiemeersch |
| 2024/0345718 | A1 | 10/2024 | Dalla Rosa |

* cited by examiner

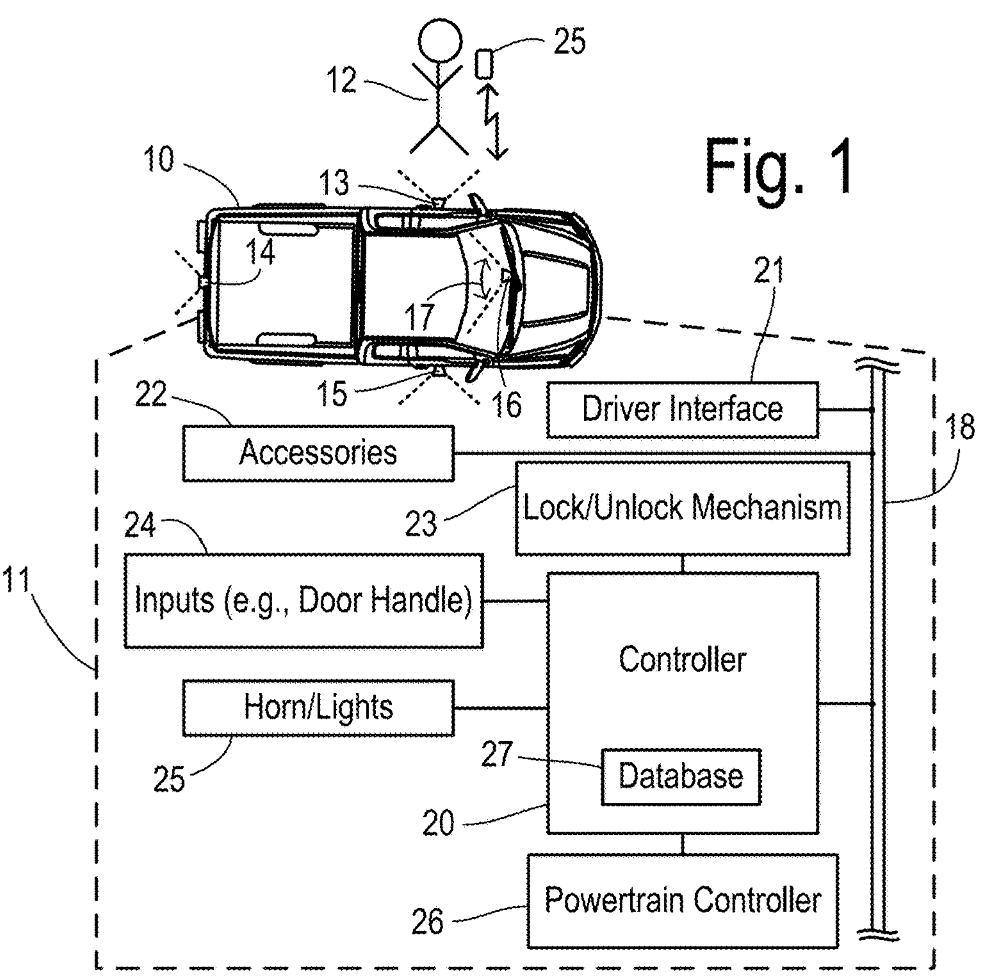
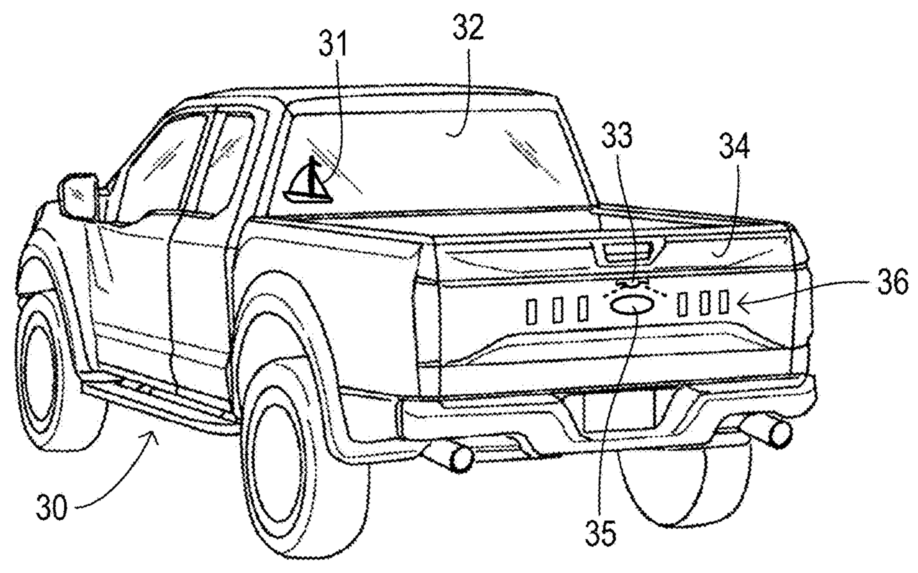
Fig. 2

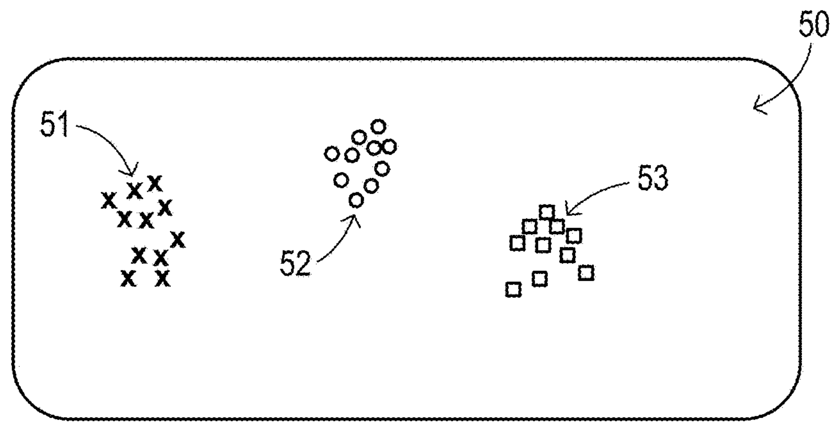
Fig. 6
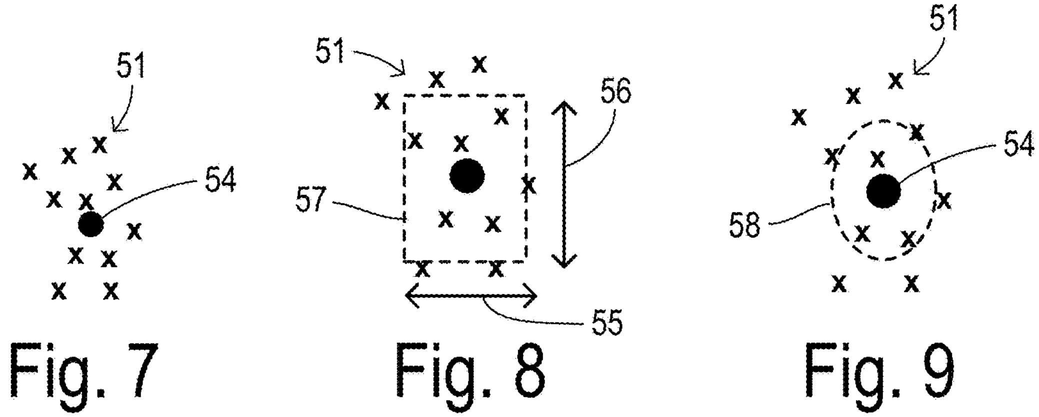
Fig. 7
Fig. 8
Fig. 9
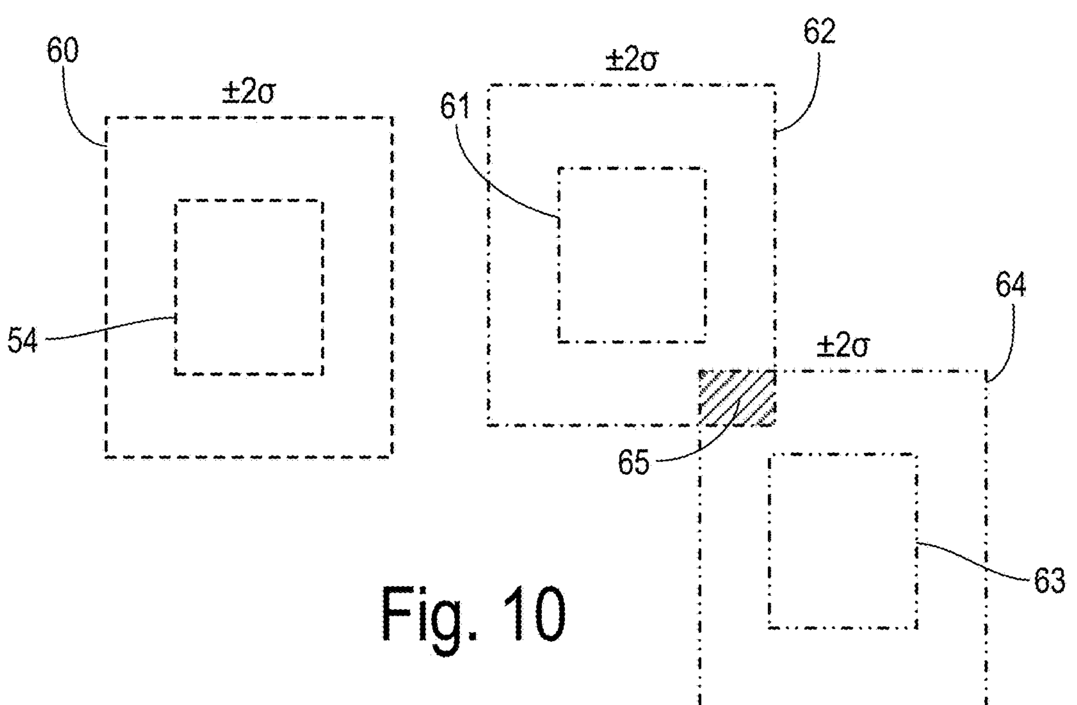
Fig. 10

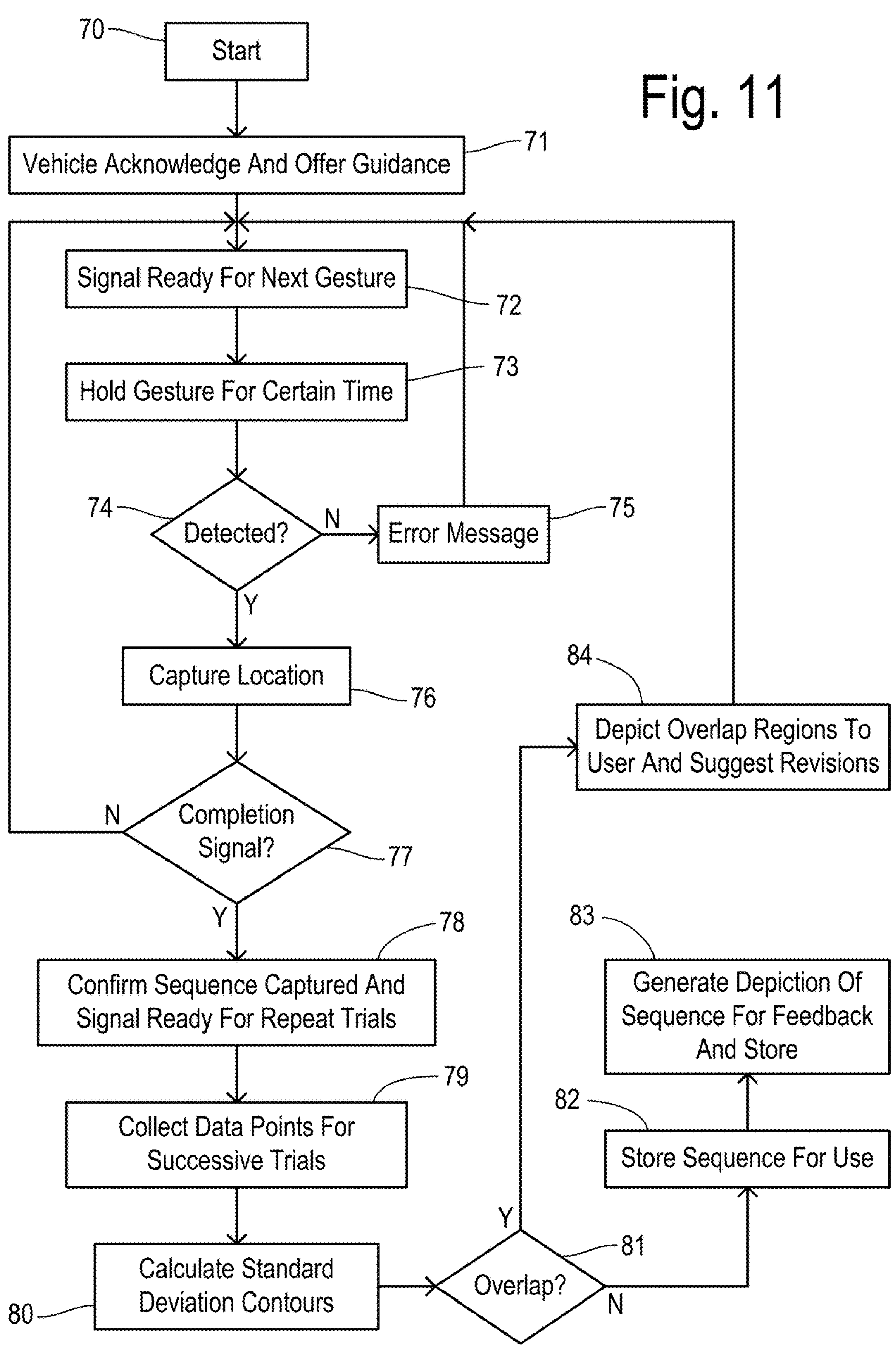

Fig. 11
70
Start
71
Vehicle Acknowledge And Offer Guidance
72
Signal Ready For Next Gesture
73
Hold Gesture For Certain Time
74
Detected?
N
Error Message
75
Y
Capture Location
76
84
Depict Overlap Regions To User And Suggest Revisions
N
Completion Signal?
77
Y
78
Confirm Sequence Captured And Signal Ready For Repeat Trials
83
Generate Depiction Of Sequence For Feedback And Store
79
Collect Data Points For Successive Trials
82
Store Sequence For Use
Y
81
Calculate Standard Deviation Contours
Overlap?
80
N

GESTURE-BASED VEHICLE ENTRY SYSTEM WITH VIRTUAL KEYPAD

CROSS REFERENCE TO RELATED APPLICATIONS

This application is a continuation of co-pending U.S. application Ser. No. 18/623,317, filed Apr. 1, 2024, entitled "Gesture-Based Vehicle Entry System with Virtual Keypad", which is incorporated herein by reference.

STATEMENT REGARDING FEDERALLY SPONSORED RESEARCH

Not Applicable.

BACKGROUND OF THE INVENTION

The present invention relates in general to a camera-based security system, and, more specifically, to user designation of a virtual keypad for entering a security key.

Motor vehicle entry and security systems are intended to prevent unauthorized access into a passenger cabin and storage compartments as well as restricting access to certain vehicle functions such as starting and/or engaging a powertrain to drive the vehicle. Physical keys and wireless key fobs have been used as a basis for controlling access in accordance with physical possession of a key device. Some fob devices operate such that when a button is pressed on the fob, the device sends a code to the vehicle to instruct the vehicle to unlock a locked closure (e.g., door, liftgate, or trunk lid). Passive entry passive start (PEPS) fobs may include a transponder following a challenge/response protocol to unlock a door when a user grasps the door handle, pinches or pushes a button, or approaches the vehicle within a predetermined distance.

Another type of entry system known as Phone-as-a-Key (PaaK) has been introduced in which users employ their smartphones to unlock a vehicle. These systems may operate in much the same way as a key fob, but may typically communicate with the vehicle using Bluetooth® Low Energy (BLE), Ultra-Wide Band (UWB), NFC, or other mobile device wireless technologies.

Additional types of security systems are known which do not require an authorized user to possess a key, key fob, or phone in order to access a vehicle. For example, keypad-based systems are known wherein a keypad positioned on the exterior of a vehicle may be used to unlock the vehicle based on a secret numeric code entered on the keypad or to lock the vehicle based on a secret numerical code or a publicly known code. Placement of a keypad on an outer surface of a vehicle incurs associated costs of the hardware, wiring, installation, and warranty.

To preserve the functionality of a keypad while avoiding some of the costs, a virtual keypad can be created in which "key press" actions by a user are detected with an alternate sensor system, such as an image sensor. For example, a temporary keypad has been projected onto a vehicle window or other surface to define the locations where the user should tap the virtual keypad to enter particular digits in a security key, and the touching of individual keys has been optically detected.

For providing secure access, a camera has been also proposed for detecting biometric data of a user, such as facial recognition. In another alternative, hand gestures such as showing a number of fingers or use of other gesture signs (e.g., sign language) can be optically detected to convey a series of distinct "digits" within a security code. Since biometric data must first be sensed for each particular authorized user in advance, a user/owner of a vehicle without a keypad would lose the ability to share a secret numeric code with a person for whom it is desired to provide access to the vehicle when the user/owner is unavailable or when their biometric identification is unsuccessful. While hand gestures may be sharable with others, the setup and performance of predefined gestures may require an inconvenient level of user education or may be subject to low accuracy of detection due to a wide range of confounding variables in the performance, detection, and classification of gestures.

SUMMARY OF THE INVENTION

The present invention enables an administrant (e.g., owner/user of a vehicle) to customize a virtual keypad made up of any arbitrary touchpoints on one or more surfaces on or near a vehicle while ensuring that a sequence making up a security code is sufficiently distinct and repeatable to provide reliable recognition in use. Features employed as "anchor points" in a sequence can be comprised of preexisting features on or near the vehicle (e.g., a badge, door handle, trim piece, junction of two parts, bend in the sheet metal skin, or spots on the ground) or a decal, sticker, or other material that is applied to the vehicle by the administrant. Thus, there is no need to force the administrant to learn and then choose from predefined gestures. Instead, a desired sequence can be performed and monitored in a way that ensures the final result will be acceptable in practice.

In one aspect of the invention, a vehicle entry system for a vehicle comprises an image sensor configured to capture real-time images according to a predetermined field of view from the vehicle. A lockout device is configured to selectably provide access to the vehicle. A controller is configured to track a plurality of touching gestures of a user outside the vehicle to identify a sequence of touchpoints which encode a security key and to operate the lockout device to provide the access when the user validly performs the sequence of touchpoints which encode the security key. The controller is adapted to preconfigure the sequence of touchpoints in a setup mode in which the controller detects an initial performance by an administrant of a timed series of distinct gestures according to a chosen number and location of touchpoints on a surface on or near the vehicle in the predetermined field of view. The controller prompts the administrant for a plurality of repetition trials of the series of distinct gestures and then detects respective touchpoints during the repetition trials to collect respective sets of datapoints for each one of the distinct gestures in the series. The controller determines a respective deviation contour for each respective set, and then expands the respective deviation contours to represent regions of validity for respective touchpoints. The controller accepts the expanded deviation contours as defining the security key if there is no overlap between any expanded deviation contours.

BRIEF DESCRIPTION OF THE DRAWINGS

FIG. 1 is a schematic, block diagram showing a vehicle and security system of the invention.

FIG. 2 is a perspective view of a vehicle with image sensors and appropriate surface features for guiding a user to the touchpoints of a sequence.

FIG. 6 is a data plot showing detected touchpoints during repeated trials for developing a security code.

FIG. 7 shows a set of data point and an arithmetic mean value.

FIG. 8 shows a standard deviation contour in the x and y directions for the data set of FIG. 7.

FIG. 9 shows a standard deviation contour determined as an ellipse for the data set of FIG. 7.

FIG. 10 shows a plurality of expanded deviation contours wherein an undesirable overlap occurs.

FIG. 11 is a flowchart showing one preferred method of configuring a security code with a virtual keypad.

DETAILED DESCRIPTION OF PREFERRED EMBODIMENTS

Figure 3:
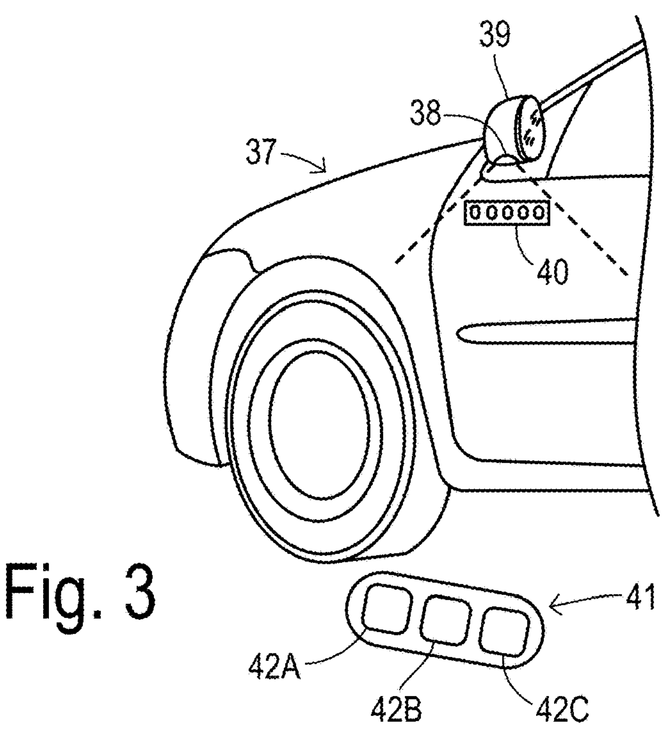
FIG. 3 is a partial perspective view of another vehicle with an image sensor and additional surface features for guiding a user to the touchpoints of a sequence.

The present invention may use a camera sensor to collect input data representative of touchpoints. The invention may be practiced in any vehicles having interior and/or exterior cameras that are tied to a vehicle controller with image processing capability to detect gestures including a finger or other appendage pointing to user-selected touchpoints. These custom gestures may include touching different points on a decal/sticker or visually identifiable spots on existing landmarks which may be parts of the vehicle or its surroundings. This sticker could be a sports logo, bumper sticker, or the like. Anything that a user can reliability touch in the same place can be the basis for a virtual key pad, and security may be enhanced since the chosen features targeted by a user for creating a security code may have little or no resemblance to a traditional keypad so that it would be impossible to guess the security code. Features that the person could reliably touch can include the top of a tailgate, a bumper, window frame, or appliques on a vehicle such as a branding badge.

Some embodiments may use an exterior sound transducer (e.g., loudspeaker and/or microphone) to enable a user to start the learning process by spoken commands. Vehicle generated messages may recommend locations for touchpoints when the customer is unsure of what places to use. The vehicle messages offering suggestions which make good locations can be shown on a touchscreen display panel, spoken aloud, or sent wireless to a user's mobile device. A vehicle controller can evaluate whether a sequence of gestures/touchpoints is sufficiently repeatable and distinct for use as a security code, which depends on a user's ability to touch the same points with enough accuracy as seen within the field of view of the image sensor(s). In particular, the closer together the touchpoints are, the higher the precision of the user's touching actions must be to achieve reliability. The vehicle controller may store representative depictions (e.g., pictures) of each gesture to display to a user in order to refresh their memory of a security code. The stored sequence can be later accessed from inside the vehicle on the touchscreen display or via an app on a mobile device, for example.

When a decal/sticker (i.e., any graphic or textual sheet which can be applied to a vehicle surface) is utilized, it may be preferable for image detection for the decal to be transparent for aesthetic reasons and/or to enable an interior camera to detect the touchpoints. Training (i.e., programing) for a desired sequence may, in particular, require that the administrant not wear gloves or that the training be based on gestures using a pencil, stylus, pointer, or corner of a handheld card. Images obtained during training (as well as during normal usage) can be decoded to track the gestures using pattern recognition, machine learning, or artificial intelligence systems as known in the art.

To initiate training, an administrant (i.e., authorized user such as an owner or a possessor of a physical or software authentication key) may start the learning process by speaking a command to an exterior microphone. In response, a vehicle controller prompts the administrant to initiate a touch/gesture in the field of view of the camera and to holding the touchpoint for a predetermined time (e.g., 3 seconds, but less than 10 seconds). Once the gesture is captured, the vehicle controller confirms and requests the next gesture. A plurality of such gestures may be detected and recorded. For a final gesture, the administrant may hold the gesture for a longer period of time (e.g., 10 seconds). The vehicle controller announces that the sequence is captured, and then requests that the sequence be repeated for a plurality of repeat trials (e.g., 10 times). The purpose of the repeated trials is to determine whether the gestures can be reliably recognized (e.g., whether there is enough separation between touchpoints). In some embodiments, the repeated trials are evaluated to determine whether or not there is any overlap between gestures targeting different touchpoints of the sequence. An overlap may be defined as conflicting gestures that are within a particular number of standard deviations of the gestures that targeted respective touchpoints. If there is any overlap, the vehicle controller may make suggestions on how to improve distinctiveness of each gesture (e.g., by displaying pictures of the overlaps and indicating where distinctiveness of each gesture can be improved).

In some embodiments, other types of user actions (e.g., sounds, spoken words, or movements) can also be inserted within a sequence of gestures to further enhance the security of the requests. For example, word or phrase can be configured to occur at a selected position within the sequence which can be detected and recognized by the vehicle controller using voice recognition to significantly enhance security.

Referring to FIG. 1, a vehicle 10 includes onboard systems 11 supporting a vehicle entry function which includes authenticating a user 12. During training, user 12 is an administrant who may be recognized based on another security key such as a wireless fob or a Phone-as-a-Key (PaaK), for example. In normal usage (i.e., after training has occurred) user 12 may be any person who knows the trained sequence of actions (e.g., touchpoints, gestures, or spoken words) which comprise a security key enabling access to vehicle 10 (e.g., door unlocking, activation of electronic systems, or starting of a powertrain).

Vehicle 10 has one or more image sensors such as cameras 14-16 deployed to obtain respective fields of view (FOV) directed to the exterior of vehicle 10, such as FOV 17 for camera 16. The image sensors may be comprised of CMOS visible light sensors or LiDAR sensors, for example. Some onboard systems 11 are interconnected by a communication bus 18, enabling an authentication controller 20 to receive image data from cameras 14-16 and to exchange data and commands with a driver interface module 21 and other accessory modules 22. Authentication controller 20 is also coupled to a door lock/unlock mechanism 23, activation inputs 24 (e.g., door handle activation sensors), interface devices 25 (e.g., loudspeakers, microphones, car horn, chirper, and/or exterior lights), and a powertrain controller 26. Authentication controller 20 includes a database 24 storing security codes and associated images after training. User 12 may carry a mobile device (e.g., smartphone) 25 which communicates with interface 21 in order to support operation of the training mode or provide a display screen for a user during subsequent usage.

Upon approaching vehicle 10, user 12 may function as the administrant who may trigger the training of a security code or may function as a normal user to perform a preexisting security code. Either action could be launched by tapping or activating a door handle or by speaking a command word or phrase, for example. Smartphone 25 in particular may be utilized in connection with activating and executing the training mode.

When a decal/sticker is utilized to create a virtual keypad, the decal/sticker may be initially placed on the vehicle within a field of view of a camera. FIG. 2 shows a vehicle 30 having a decal 31 attached to a window glass 32 within view of an internal camera (not shown). Decal 31 may be partially transparent and is shown with a drawing of a sailboat to provide several landmarks for use in defining a security code. Vehicle 30 also shows an exterior camera 33 (e.g., on a tailgate of a pickup truck) with a field of view enabling camera 33 to capture real-time images of a branding badge 35 and styling surface-features (e.g., depressions) 36, all of which may provide landmarks to be incorporated into the gestures defining a security code.

FIG. 3 shows a vehicle 37 with an exterior camera 38 mounted in a sideview mirror 39. A field of view of camera 38 includes a door panel onto which a decal 40 is applied with landmark features such as button graphics. Camera 38 may be integrated with a light source which projects a landmark image 41 onto a ground surface nearby vehicle 37. Image 41 includes symbols 42A, 42B, and 42C for guiding a user when performing gestures for a security code. The pointing gestures could be performed by pointing a user's foot, for example.

Figure 4:
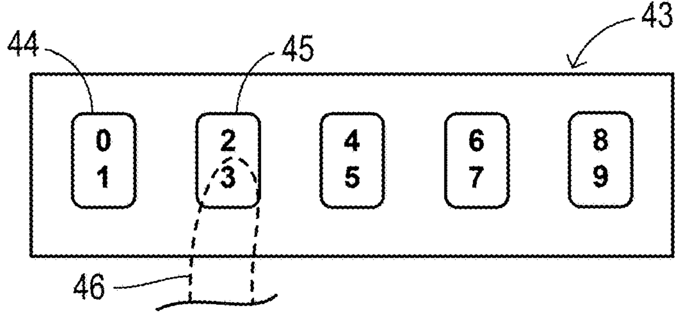
FIG. 4 is a plan view showing a numeric sticker which is adapted to be applied to a vehicle surface to provide features for touchpoints.
Figure 5:
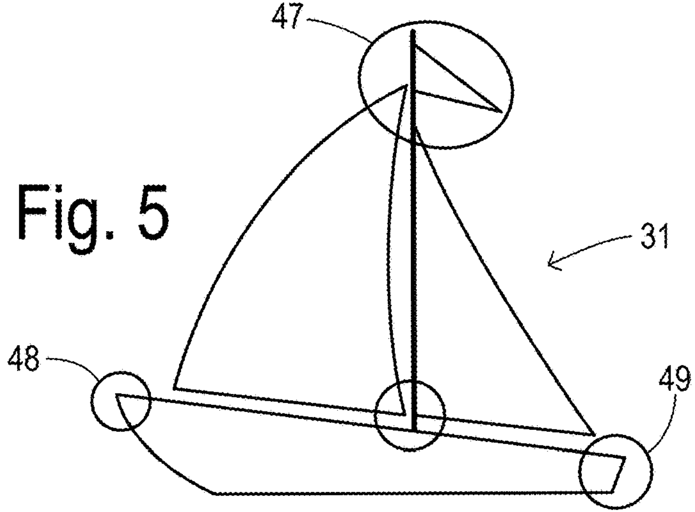
FIG. 5 is a plan view of a graphic decal which is adapted to be applied to a vehicle surface to provide features for touchpoints.

FIG. 4 shows a decal 43 which may have a backing surface carrying an adhesive for affixing to a vehicle surface. A front surface of decal 43 shows a plurality of visible features which the user can associate with a sequence of touchpoints, wherein the features include a virtual button area 44 and a virtual button area 45 which can be tapped by a user's finger 46. For ease in remembering a sequence, button areas can be labeled using numbers, letters, words, pictures, symbols, logos, colors, or other recognizable markers. FIG. 5 shows sailboat decal 31 in greater detail. Among the features that a user can select as a touchpoint include a flag 47, bow 48, and stern 49. Anything that a user can keep in mind and which can guide a touching gesture with sufficient distinctiveness and repeatability could be selected.

To evaluate such distinctiveness and repeatability, the user is required to perform a plurality of repeated trials for any particular sequence. FIG. 6 represents a data space 50 having coordinates defined according to the field of view of the camera(s) which capture real-time images of the corresponding gestures. For each separate touchpoint in a series of distinct gestures, a respective set of datapoints is collected. A set of datapoints 51 (corresponding to a particular gesture in a chosen series of distinct gestures all directed to a respective location chosen by the administrant) is represented by small x's. A set of datapoints 52 is represented by small o's and a set of datapoints 53 is represented by small boxes, each set corresponding to a respective gesture in the series. Each datapoint in a respective set is an instance of a replication of a respective touchpoint being targeted by the administrant/user. The spread of datapoints within a set for a respective touchpoint, and the separation between the respective sets can be analyzed to determine whether the gestures can be reliably detected and classified.

In particular, a deviation contour is determined for each respective set of datapoints as a region which may contain valid instances of the touchpoints for a respective gesture. In some embodiments, the deviation contour is characterized according to a deviation with respect to an expected value calculated from the datapoints. Preferably, the deviation may be comprised of a standard deviation and the expected value may be an arithmetic mean value (e.g., average). Alternatively, the deviation may be comprised of a contoured boundary which circumscribes all of the datapoints. For example, the contoured boundary may be defined as a circle with a center located at an average location of the datapoints and a radius equal to a maximum of the distances of individual datapoints from the average.

FIG. 7 shows the datapoints of set 51 plotted in two dimensions, wherein an expected value 54 is determined as an arithmetic average of the X-coordinates and the Y-coordinates. Standard deviation is useful as a measure of the degree of dispersion (scatter) of a data set. FIG. 8 shows a deviation contour 57 according to a calculation of the standard deviation ($\sigma$) in X and the standard deviation in Y with respect to expected (mean) value 54. The standard deviations in X and Y are the square roots of their variances, as follows:

$$\sigma_X = \sqrt{\frac{\sum (X-\mu)^2}{N}} \quad \sigma_Y = \sqrt{\frac{\sum (Y-\mu)^2}{N}}$$

where $\mu$ is the mean, N is the population size of the data set, X is the set of X-coordinates for the population of datapoints, and Y is the set of Y-coordinates for the population of datapoints. Contour 57 is a rectangle centered on expected value 54 with a side 55 of $\pm\sigma_x$ (i.e., a width of $2\sigma_x$) and a side 56 of $\pm\sigma_y$, (i.e., a height of $2\sigma_y$). Alternatively, the standard deviation contour can be calculated as a standard deviation ellipse (SDE) based on the X and Y standard deviations as follows:

$$SDE = \sqrt{\sigma_X^2 + \sigma_Y^2}.$$

The SDE is centered on the mean value to provide a deviation contour 58 shown in FIG. 9.

The deviation contour reflects a scatter region over which a user's attempts to gesture onto a corresponding feature have fallen. To provide enough separation between different touchpoints within a series which defines a security code to ensure that respective gestures are distinct, the deviation contours are expanded to provide a buffer margin between them. The expanded contours represent regions of validity for recognizing each respective touchpoint in the security code. In order to have provided a valid series of gestures, the expanded contours must not have any overlaps which would show ambiguity in determining which gestures is intended for any particular touchpoint in a security code.

FIG. 10 shows a plurality of deviation contours and respective expanded contours obtained after a plurality of repeated trials during a set up mode for creating a security key. Standard deviation contours 54, 61, and 63 are shown, wherein each rectangular contour has a size of $\pm 1\sigma_x$ and $\pm 1\sigma_y$ from the X-coordinates and the Y-coordinates of each respective set of datapoints. In this example, each deviation contour is expanded by multiplying by a predetermined factor of 2, so that each expanded deviation contour has a size of $\pm 2\sigma_x$ and $\pm 2\sigma_y$ as shown by expanded contours 60, 62, and 64. Expanded contours 62 and 64 encompass an overlap 65 as a result of the expansion. This indicates that the chosen locations for respective touchpoints in the sequence are not sufficiently separate and distinct. Therefore, the performed series of gestures is not acceptable. Thus, an administrant would be prompted to modify the desired series of touchpoints. Preferably, a mapping of the overlap would be communicated to the administrant so that the problem can be avoided on a follow-up attempt at the set up mode.

FIG. 11 shows a preferred method of the invention wherein an administrant initiates the set up mode in step 70. Entering the set up mode can be triggered by the administrant by speaking a spoken command outside the vehicle, entering a command via a remote control app on the administrant's mobile device, or on a touchscreen display in the vehicle, for example. In step 71, the vehicle controller acknowledges the entry into the startup mode and then may offer guidance to the administrant via audio instructions and/or graphic and text displays on the vehicle display panel or mobile device. When ready, the administrant executes an initial performance of a time series of distinct gestures according to a chosen number and location of touchpoints on a surface on or near the vehicle which is within a predetermined field of view of the vehicle image sensors. In step 72, the vehicle controller signals that it is ready to receive a gesture. In step 73, the administrant holds a gesture on a particular touchpoint for a predetermined time (e.g., 3 seconds). For example, the administrant may hold an index finger on a particular character or digit on a decorated decal that has been applied to an exterior vehicle surface. In step 74, the vehicle controller checks to determine whether a gesture has continued for the predetermined time. If not, then an error message may be generated in step 75 to inform the administrant, and a return is made to step 72 to prompt the administrant to perform a next gesture. If a gesture is detected in step 74, then the location indicated by the gesture is captured in step 76. In step 77, the vehicle controller checks for a completion signal. A completion signal may be comprised of the administrant continuing to hold a particular gesture for an even longer period of time (e.g., 10 seconds). Alternatively, a completion signal could be generated by a spoken command or by manual entry of a completion command on the administrant's mobile device or on the vehicle touchscreen display panel. If there is no completion signal, then a return is made to step 72 in order to obtain a next gesture in the series of gestures. During the performance of the series of gestures, the vehicle controller may offer various suggestions or other guidance to the at administrant as needed.

Once a completion signal is detected, a plurality of repeated trials are requested by the vehicle controller in step 78. Enough trials are repeated such that a sufficient population data size is obtained to allow confirmation of distinctness and repeatability of the series sequence of gestures (e.g., 10 trials). In response, the administrant performs the sequence for the predetermined number of times while the vehicle controller collects datapoints for the successive trials. In step 80, the vehicle controller calculates deviation contours (e.g., standard deviation contours) and then expands the contours as described above. In step 81, a check is performed to determine whether any of the expanded deviation contours overlap with one another. If an overlap is detected in step 81, then any overlap regions may be displayed to the administrant in step 84 and suggested revisions to alleviate the overlap may be provided via the user interfaces (e.g., text to speech, vehicle display panel, or mobile device). If there is no detected overlap between any expanded deviation contours, then the expanded deviation contours are accepted in step 82 as defining the sequence of touch points for the security key by storing the sequence. In step 83, the vehicle controller may generate a depiction of the stored sequence and store it for use as feedback and/or for presentation in response to subsequent requests from users to refresh their memory of the security key. This completes the set up mode. Later, when the vehicle is locked or features are otherwise restricted, attempted entries of users into the vehicle may be tracked. A user may trigger an unlock operation (e.g., by activating a door handle) and then performs the plurality of touching gestures outside the vehicle while being monitored by the vehicle cameras. If the user performs the sequence of touchpoints encoding the security key correctly, a lockout device in the vehicle is triggered to provide access to the vehicle.

Figure 12:
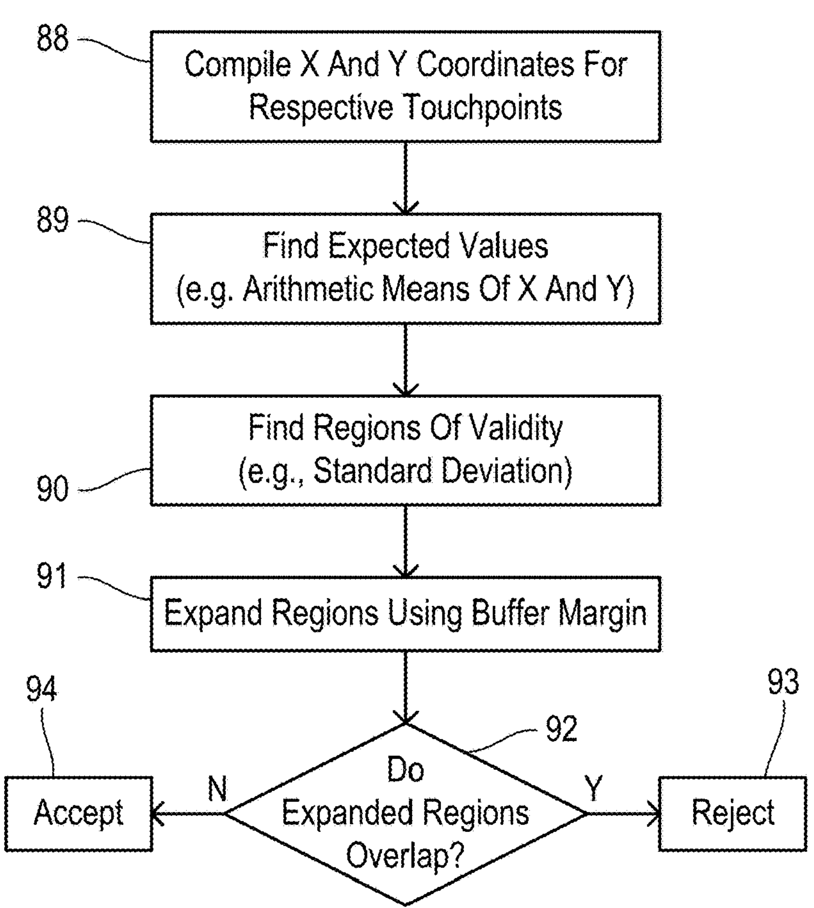
FIG. 12 is a flowchart showing a process for determining deviation contours and comparing the expanded deviation contours in greater detail.

FIG. 12 is a flowchart showing one preferred method for determining standard deviation contours and expanded contours in greater detail. In step 88, X and Y coordinates for the touchpoints within each respective data set are compiled. Expected values are determined for each respective data set in step 89. For example, the arithmetic means for the X and Y coordinates are calculated, whereby the respective mean X and Y values define each expected value. Based on the expected value of each data set, a region of validity is found in step 90 based on the standard deviation, maximum values, or other characterization of the dispersion around the expected value for each data set. In step 91, the deviation contours are expanded into larger regions using a buffer margin. Preferably, a standard deviation contour may be expanded by multiplying the respective standard deviations by a predetermined factor in a range from 1.5 to 3.5. More preferably, the predetermined factor may range between 2 and 3. In an embodiment wherein a deviation contour is based on a maximum distance from the mean value (instead of the standard deviation), the expansion may also comprise multiplication by a predetermined factor which is selected to provide a desired buffer margin. A check is performed in step 92 to determine whether expanded regions overlap. If they overlap, then the proposed sequence of touchpoints is rejected in step 93. Otherwise, they are accepted in step 94.

Figure 13:
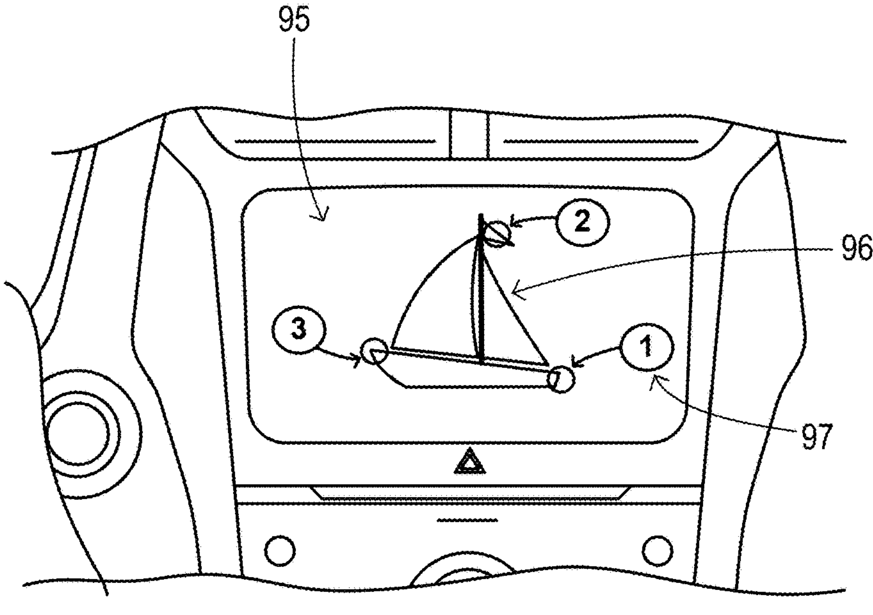
FIG. 13 is a front view showing a display panel in a vehicle depicting an established sequence of touchpoints which encode a security key.

FIG. 13 depicts an example of a touchscreen display panel 95 in a vehicle. Display panel 95 displays images for assisting in the creation and/or recall of gestures in a security key. Depictions on display panel 95 may be based on images captured by the vehicle interior and/or exterior cameras. Thus, they may include a captured image of a decal that has been applied to a vehicle exterior surface, for example. In FIG. 13, a decal 96 of a sailboat is shown wherein a plurality of touchpoints have been added according to a sequence previously stored during set up mode. Labels 97 identify the sequential order for the gestures making up the security key.

What is claimed is:

1. A vehicle entry system for a vehicle, comprising:

an image sensor configured to capture real-time images according to a predetermined field of view from the vehicle;

a lockout device configured to selectably provide access to the vehicle; and a controller configured to track a plurality of touching gestures of a user outside the vehicle to identify a sequence of touchpoints which encode a security key and to operate the lockout device to provide the access when the user validly performs the sequence of touchpoints which encode the security key, wherein the controller is adapted to preconfigure the sequence of touchpoints in a setup mode in which the controller:

(A) detects an initial performance by an administrant of a timed series of distinct gestures according to touchpoints on a surface on or near the vehicle;

(B) prompts the administrant for a plurality of repetition trials of the series of distinct gestures;

(C) detects respective touchpoints during the repetition trials to provide a population of data to identify a contour of distinct gestures in the series to encode the security key;

(D) triggers an unlock operation when the user performs touching gestures outside the vehicle; and (E) operates the lockout device to provide the access when the user validly performs the sequence of touchpoints according to the contour which encodes the security key.

2. The vehicle entry system of claim 1 wherein the controller in the setup mode determines a respective deviation contour for each respective set according to a respective expected value for each respective set.

3. The vehicle entry system of claim 2 wherein each respective expected value is comprised of a respective arithmetic mean value for each respective set.

4. The vehicle entry system of claim 3 wherein each respective deviation contour is comprised of a standard deviation contour around the respective arithmetic mean value.

5. The vehicle entry system of claim 4 wherein the controller in the setup mode expands the respective standard deviation contours by multiplying respective standard deviations by a predetermined factor in a range from 1.5 to 3.5.

6. The vehicle entry system of claim 4 wherein the controller in the setup mode expands the respective standard deviation contours by multiplying respective standard deviations by a predetermined factor in a range from 2 to 3.

7. The vehicle entry system of claim 3 wherein each respective deviation contour is comprised of a respective region around the respective arithmetic mean value with a diameter according to a maximum deviation in each respective set of datapoints from the respective arithmetic mean value.

8. The vehicle entry system of claim 1 further comprising a decal applied to the surface of the vehicle within the predetermined field of view, wherein the decal includes visible features which the user associates with the sequence of touchpoints.

9. The vehicle entry system of claim 1 wherein during the initial performance, the controller (1) recognizes one or more nonfinal held gestures which each lasts for a first predetermined detection time at a respective touchpoint, and (2) recognizes a final held gesture which lasts for a second predetermined detection time at a respective touchpoint, wherein the second predetermined detection time is longer than the first predetermined detection time.

10. The vehicle entry system of claim 1 further comprising a display panel visible in an interior of the vehicle, wherein the controller is configured to activate the display panel in response to a user request after the setup mode to show images depicting the surface and the sequence of touchpoints.

11. The vehicle entry system of claim 1 further comprising a display panel visible in an interior of the vehicle, wherein the controller is further configured in the setup mode to (i) reject the expanded deviation contours as defining the security key if there is an overlap between any expanded deviation contours, (ii) activate the display panel to show images depicting the overlapping expanded deviation contours, and (iii) prompt the administrant to perform a revised series of distinct gestures to avoid the overlap.

12. A method for controlling access to a vehicle, wherein the vehicle includes an image sensor configured to capture real-time images according to a predetermined field of view from the vehicle and a lockout device configured to selectably provide access to the vehicle, the method comprising the steps of:

entering a setup mode for preconfiguring a sequence of touchpoints as a security key;

an administrant performing an initial performance of a timed series of distinct gestures according to touchpoints on a surface on or near the vehicle;

identifying the locations of the touchpoints using the captured real-time images;

the administrant performing a plurality of repetition trials of the series of distinct gestures;

identifying the locations of the touchpoints during the repetition trials using the captured real-time images to provide sets with a population of data to identify a contour of distinct gestures in the series;

exiting the setup mode;

triggering an unlock operation when the user performs touching gestures outside the vehicle; and operating the lockout device to provide the access when the user validly performs the sequence of touchpoints according to the contour which encodes the security key.

13. The method of claim 12 further comprising the step of determining a respective deviation contour for each respective set by finding a respective expected value for each respective set.

14. The method of claim 13 wherein each respective expected value is comprised of a respective arithmetic mean value for each respective set.

15. The method of claim 14 wherein the step of determining each respective deviation contour is comprised of determining a standard deviation contour around the respective arithmetic mean value.

16. The method of claim 15 wherein the step of expanding the respective standard deviation contours is comprised of multiplying the respective standard deviations by a predetermined factor in a range from 1.5 to 3.5.

17. The method of claim 15 wherein the step of expanding the respective standard deviation contours is comprised of multiplying the respective standard deviations by a predetermined factor in a range from 2 to 3.

18. The method of claim 12 wherein the initial performance is comprised of one or more nonfinal held gestures which each lasts for a first predetermined detection time at a respective touchpoint, and a final held gesture which lasts for a second predetermined detection time at a respective touchpoint, wherein the second predetermined detection time is longer than the first predetermined detection time.

19. The method of claim 12 wherein the vehicle includes a display panel visible in an interior of the vehicle, wherein the method further comprises the step of:

activating the display panel in response to a user request after the setup mode to show images depicting the surface and the sequence of touchpoints.

20. The method of claim 12 wherein the vehicle includes a display panel visible in an interior of the vehicle, wherein the method further comprises the steps of:

rejecting the expanded deviation contours as defining the security key if there is an overlap between any expanded deviation contours;

activating the display panel to show images depicting the overlapping expanded deviation contours;

prompting the administrant to perform a revised series of distinct gestures to avoid the overlap.

* * * * *